(12) United States Patent
Chen et al.

(10) Patent No.: US 11,763,594 B2
(45) Date of Patent: Sep. 19, 2023

(54) DRIVER INTEGRATED CIRCUIT FOR FINGERPRINT SENSING, TOUCH SENSING AND DISPLAY DRIVING AND DRIVING METHOD THEREOF

(71) Applicant: Novatek Microelectronics Corp., Hsinchu (TW)

(72) Inventors: Jou-Chia Chen, Yunlin County (TW); Hsing-Lung Chung, Miaoli County (TW); Ding-Teng Shih, Taoyuan (TW); Yi-Ting Chung, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 239 days.

(21) Appl. No.: 17/123,134

(22) Filed: Dec. 16, 2020

(65) Prior Publication Data
US 2021/0200977 A1 Jul. 1, 2021

Related U.S. Application Data

(60) Provisional application No. 62/953,586, filed on Dec. 26, 2019.

(51) Int. Cl.
*G06V 40/13* (2022.01)
*G06F 3/041* (2006.01)
*G06F 21/84* (2013.01)
*G06F 21/32* (2013.01)

(52) U.S. Cl.
CPC ........ *G06V 40/1318* (2022.01); *G06F 3/0412* (2013.01); *G06F 3/0416* (2013.01); *G06F 21/32* (2013.01); *G06F 21/84* (2013.01)

(58) Field of Classification Search
CPC .. G06F 3/0416; G06F 3/0412; G06F 3/04166; G06F 21/32; G06F 21/84; G06V 40/1318; G06V 40/1306
See application file for complete search history.

(56) References Cited

U.S. PATENT DOCUMENTS

| 10,607,097 | B2 | 3/2020 | Deng et al. |
| 2018/0329560 | A1 | 11/2018 | Kim et al. |
| 2018/0349669 | A1* | 12/2018 | Kim .................. G06V 40/1318 |

(Continued)

FOREIGN PATENT DOCUMENTS

| CN | 106716431 | 5/2017 |
| CN | 107817964 | 3/2018 |
| CN | 108985146 | 12/2018 |

*Primary Examiner* — Yaron Cohen
(74) *Attorney, Agent, or Firm* — JCIPRNET

(57) ABSTRACT

A driver integrated circuit for fingerprint sensing, touch sensing and display driving and a driving method thereof are provided. The driver integrated circuit is adapted for driving a touch display panel with a fingerprint sensor. The driver integrated circuit includes a fingerprint sensing control circuit, a display driving circuit, and a display driving circuit. The fingerprint sensing control circuit drives the fingerprint sensor to perform a fingerprint sensing operation. The display driving circuit drives the touch display panel to perform a display operation. The touch sensing control circuit drives the touch display panel to perform a touch operation. The fingerprint sensing control circuit and the display driving circuit have a first direct communication therebetween so as to facilitate at least one of the fingerprint sensing operation and the display operation.

38 Claims, 7 Drawing Sheets

(56) References Cited

U.S. PATENT DOCUMENTS

2019/0019048 A1    1/2019   Deng et al.
2019/0294851 A1    9/2019   Chung et al.
2019/0354226 A1   11/2019   Choi et al.

* cited by examiner

DRIVER INTEGRATED CIRCUIT FOR FINGERPRINT SENSING, TOUCH SENSING AND DISPLAY DRIVING AND DRIVING METHOD THEREOF

CROSS-REFERENCE TO RELATED APPLICATION

This application claims the priority benefit of U.S. provisional application Ser. No. 62/953,586, filed on Dec. 26, 2019. The entirety of the above-mentioned patent application is hereby incorporated by reference herein and made a part of this specification.

BACKGROUND

Technical Field

The disclosure relates to a driver circuit, and particularly relates to a driver integrated circuit for fingerprint sensing, touch sensing, and display driving and a driving method thereof.

Description of Related Art

For a general terminal device having fingerprint sensing, touch sensing, and display driving functions, the general terminal device may include a fingerprint sensing control chip, a touch sensing control chip, and a display driving control chip, and the above chips are communicated with the central processing unit of the terminal device independently. Hence, when the terminal device performs a fingerprint identification operation for, for example, a unlock operation or an important software operation, the above chips will communicate with the central processing unit of the terminal device in a time-sharing manner, and the communication between the above chips and the central processing unit of the terminal device must wait for the mode change of the central processing unit of the terminal device, for example, wait for the central processing unit is changed between a rich execution environment (REE) mode and a trusted execution environment (TEE) mode. That is to say, since the central processing unit of the terminal device need to waste a lot of times to frequently change the operation mode, the fingerprint identification operation of the unlock operation also needs more time to complete. Therefore, regarding how to provide a driving circuit and a driving method with high-efficiency driving capability, solutions of several embodiments are provided below.

SUMMARY

The disclosure is directed to a driver integrated circuit for fingerprint sensing, touch sensing, and display driving and a driving method thereof, and are capable of quickly performing a fingerprint identification operation to determine whether to further perform an unlock operation of a terminal device.

The driver integrated circuit of the disclosure is adapted for driving a touch display panel with a fingerprint sensor. The driver integrated circuit includes a fingerprint sensing control circuit, a display driving circuit, and a touch sensing control circuit. The fingerprint sensing control circuit is configured to drive the fingerprint sensor to perform a fingerprint sensing operation. The display driving circuit is configured to drive touch display panel to perform a display operation. The touch sensing control circuit is configured to drive the touch display panel to perform a touch operation. The fingerprint sensing control circuit and the display driving circuit are configured to have a first direct communication therebetween so as to facilitate at least one of the fingerprint sensing operation and the display operation.

The driving method of the disclosure is adapted to a driver integrated circuit for fingerprint sensing, touch sensing and display driving. The driver integrated circuit is adapted for driving a touch display panel with a fingerprint sensor, and the driver integrated circuit includes a fingerprint sensing control circuit, a display driving circuit, and a touch sensing control circuit. The driver integrated circuit includes the following step: facilitating at least one of a fingerprint sensing operation and a display operation through a first direct communication between the fingerprint sensing control circuit and the display driving circuit.

Based on the above, according to the driver integrated circuit and the driving method of the disclosure, the driver integrated circuit is capable of quickly performing a fingerprint sensing operation by establishing the first direct communication between the fingerprint sensing control circuit and the display driving circuit integrated in the driver integrated circuit and by establishing the second direct communication between the fingerprint sensing control circuit and the processing circuit of the terminal device.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
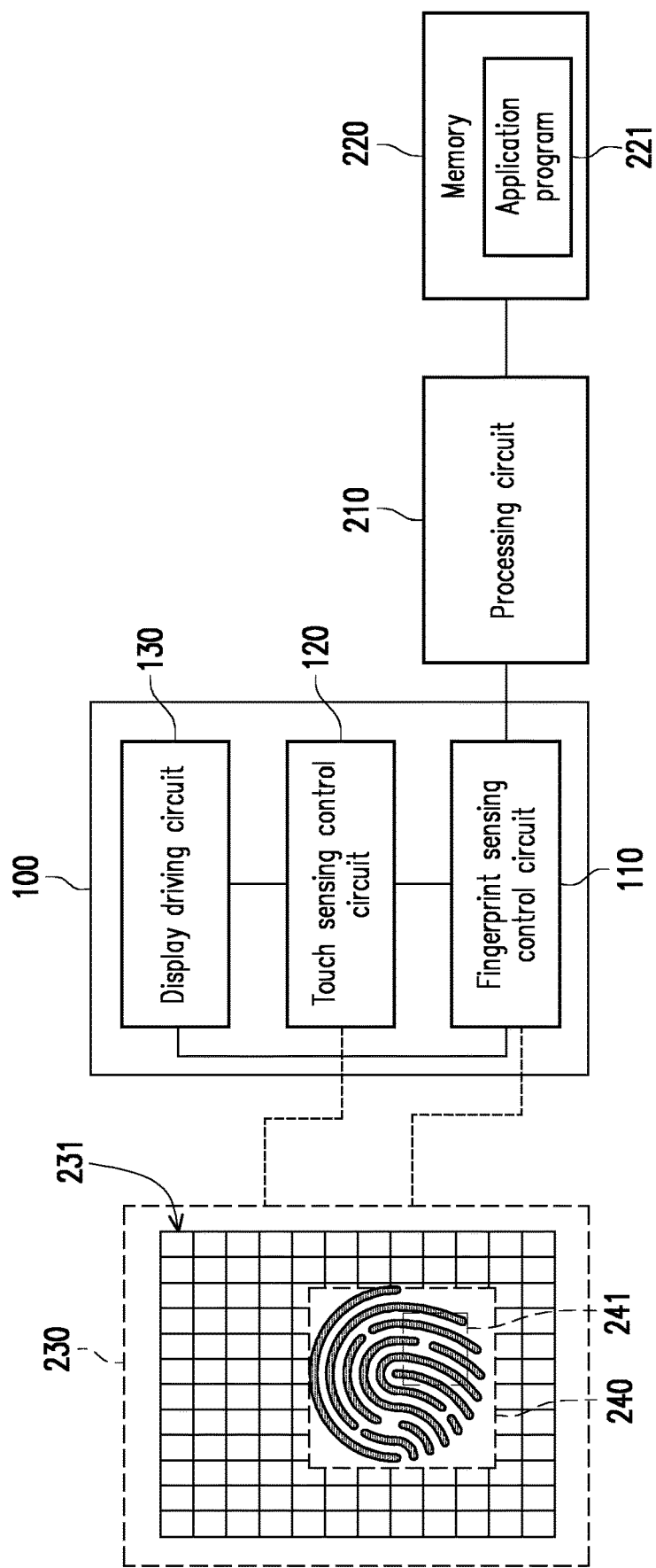
FIG. 1 is a schematic diagram illustrating a driver integrated circuit and a terminal device according to an embodiment of the disclosure.

FIG. 1 is a schematic diagram illustrating a driver integrated circuit and a terminal device according to an embodiment of the disclosure. Referring to FIG. 1, the terminal device 10 includes a driver integrated circuit 100, a processing circuit 210, a memory 220, and a touch display panel 230 with a fingerprint sensor. In the embodiment of the disclosure, the driver integrated circuit 100 may be a fingerprint, touch, and display driver integrated chip (FTDI IC). The driver integrated circuit 100 includes a fingerprint sensing control circuit 110, a touch sensing control circuit 120, and a display driving circuit 130. In the embodiment of the disclosure, the fingerprint sensing control circuit 110 and the display driving circuit 130 are configured to have a first direct communication therebetween so as to facilitate at least one of the fingerprint sensing operation and the display operation.

In the embodiment of the disclosure, the driver integrated circuit 100 may be coupled to the processing circuit 210 and the touch display panel 230. The processing circuit 210 external to the driver integrated circuit 100, and coupled to the memory 220, and the processing circuit 210 can access the memory to execute an application program 221 stored in the memory 220, where the application program 221 may be an operation system or a function software. In the embodiment of the disclosure, the fingerprint sensing control circuit 110 may configured to drive the fingerprint sensor to perform a fingerprint sensing operation. The display driving circuit 120 may configured to drive the touch display panel 230 to perform a display operation. The touch sensing control circuit 130 may configured to drive the touch display panel 230 to perform a touch operation.

In the embodiment of the disclosure, the touch display panel 230 may include a display panel and a touch panel, where the touch panel may be disposed under the display panel. In the embodiment of the disclosure, the display panel may, for example, be a liquid-crystal display (LCD), a light emitting diode (LED) display, or an organic light-emitting diode (OLED) display. The display panel may, for example, include a pixel array 231, and the pixel array 231 may include a plurality of display pixels and a plurality of sensing pixels for fingerprint sensing arranged in an array. In the embodiment of the disclosure, the processing circuit 210 may be a central processing unit (CPU) of the terminal device 10. The terminal device 10 may a mobile phone or a tablet with fingerprint sensing function, but the disclosure is not limited thereto.

In the embodiment of the disclosure, the driver integrated circuit 100 may establish the first direct communication for between the fingerprint sensing control circuit 110 and the display driving circuit 130. In the embodiment of the disclosure, the first direct communication may occur under a rich execution environment (REE) mode, in which the display driving circuit 130 is configured to light up at least one fingerprint sensing region on the touch display panel 230 and then inform the fingerprint sensing control circuit 110 to start performing the fingerprint sensing operation during the first direct communication. Specifically, in the embodiment of the disclosure, the fingerprint sensing control circuit 110 may configured to be informed by a touch-on event by the touch sensing control circuit 120, and inform the display driving circuit 130 to light up a fingerprint sensing region 241 on the touch display panel 230 during the first direct communication. It is should be noted that there are multiple interfaces between the fingerprint sensing control circuit 110, the touch sensing control circuit 120, and the display driving circuit 130 for direct communicating with each other.

Moreover, in the embodiment of the disclosure, the driver integrated circuit 100 may establish a second direct communication between the fingerprint sensing control circuit 110 and the processing circuit 210. The fingerprint sensing control circuit 110 has a second direct communication with the processing circuit 210 external to the driver integrated circuit 100, and the first direct communication may occur after the second direct communication and cause the display driving circuit 130 to adjust the display operation. In most operating scenarios, the driver integrated circuit 100 mainly communicates with the processing circuit 210 through the fingerprint sensing control circuit 110 during a period of a fingerprint identification operation in an unlock operation of the terminal device 10, so as to reduce the time of operation mode change of the processing circuit 210. In the embodiment of the disclosure, the second direct communication may occur after the first direct communication and causes the processing circuit 210 to perform an user authentication operation. It is should be noted that, each of the first direct communication and the second direct communication occurs under the TEE mode, and the each of the first direct communication and the second direct communication occurs during the fingerprint sensing operation is being performed by the fingerprint sensing control circuit 110.

Figure 2:
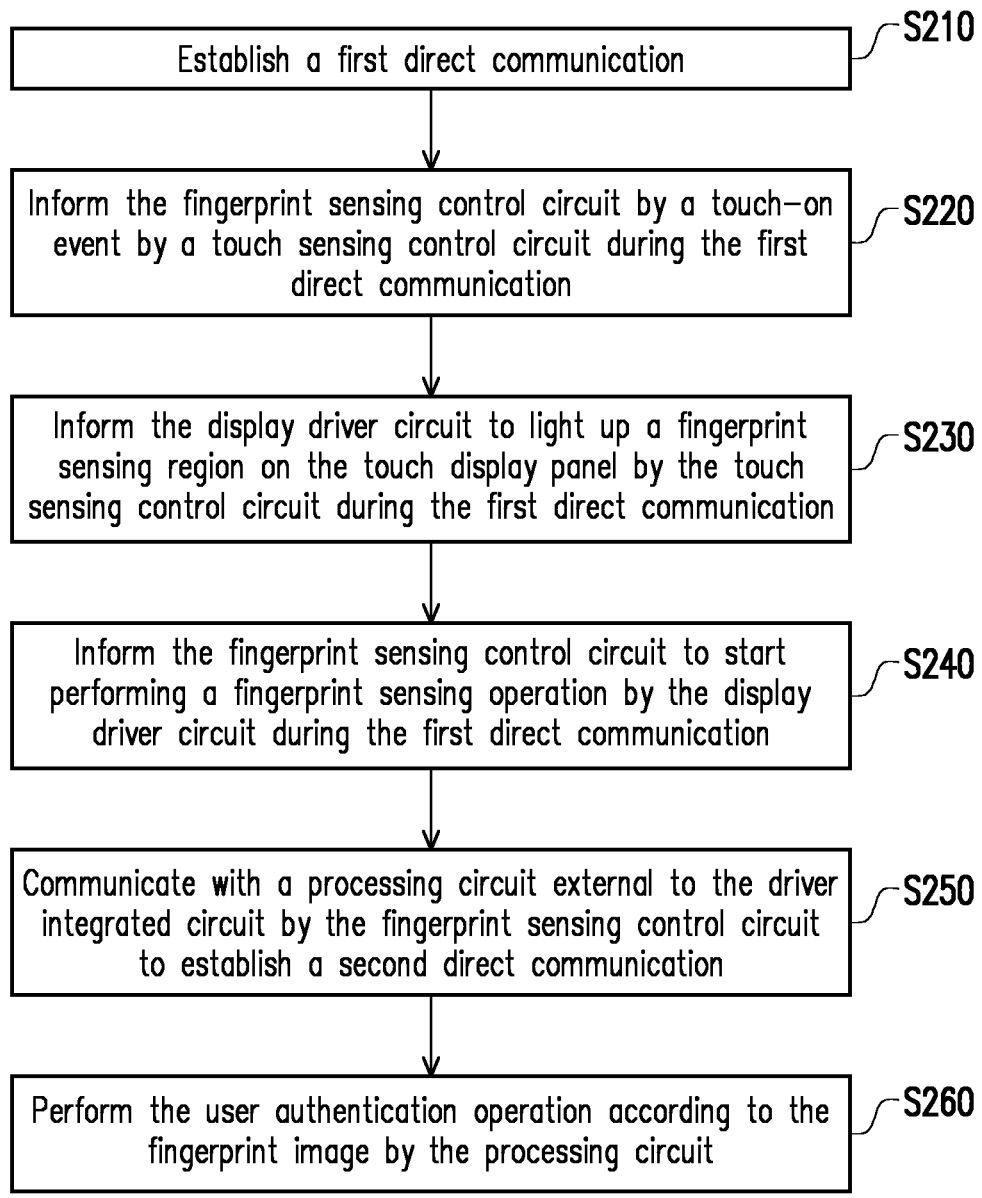
FIG. 2 is a flowing chart illustrating a driving method according to an embodiment of the disclosure.

FIG. 2 is a flowing chart illustrating a driving method according to an embodiment of the disclosure. Referring to FIG. 1 and FIG. 2, the driver integrated circuit 100 may execute the following steps S210 to S260 to perform the fingerprint identification operation in the unlock operation of the terminal device 10. In step S210, the driver integrated circuit 100 may establish the first direct communication for facilitating at least one of the fingerprint sensing operation and a display operation. In the embodiment of the disclosure, when a touch object 240 (user's finger) is placed on the touch display panel 230 to trigger a touch-on event, so that the touch sensing control circuit 120 may output a enable signal to one of the fingerprint sensing control circuit 110 and the display driving circuit 130, so that the one of the fingerprint sensing control circuit 110 and the display driving circuit 130 further enables the at least one of the fingerprint sensing control circuit 110 and the display driving circuit 130 according to the touch-on event on the touch display panel 230. The display driving circuit 130 in response to the touch-on event on the touch display panel 230.

In step S220, the touch sensing control circuit 120 may inform the fingerprint sensing control circuit 110 by the touch-on event during the first direct communication. In the embodiment of the disclosure, the touch sensing control circuit 120 may awake up the fingerprint sensing control circuit 110. In step S230, the touch sensing control circuit 120 may inform the display driving circuit 130 to light up the fingerprint sensing region 241 on the touch display panel 230 during the first direct communication. In the embodiment of the disclosure, the touch display panel 230 may be pre-operated in a dark screen state, and when the display driving circuit 130 is enabled to light up the touch display panel 230, the touch display panel 230 is changed to operate in a bright screen state. The touch display panel 230 is lighted up to display a light pattern for illuminating the touch object 240 placed on the touch display panel 230. In step S240, the display driving circuit 130 may inform the fingerprint sensing control circuit 110 to start performing the fingerprint sensing operation during the first direct communication.

In step S250, the fingerprint sensing control circuit 110 communicates with the processing circuit 210 external to the driver integrated circuit 100 to establish the second direct communication. In the embodiment of the disclosure, the fingerprint sensing control circuit 110 may obtain a fingerprint image, and the fingerprint sensing control circuit 110 provide the fingerprint image to the processing circuit 210 through the second direct communication. In step S260, the processing circuit 210 performs the user authentication operation according to the fingerprint image. Therefore, regardless of whether the processing circuit 210 of the terminal device 10 is busy or idle, the driver integrated circuit 100 may light up the touch display panel 230 and execute the fingerprint sensing without a control command from the processing circuit 210, so as to effectively reduce the time required for waiting for the processing circuit 210 switching operations in different operating system environments for generating the control command. Thus, the driver integrated circuit 100 may quickly perform the fingerprint sensing operation. Furthermore, more detailed implementation of the terminal device 10 and the driver integrated circuit 100 will be further illustrated by the following several embodiments.

Figure 3:
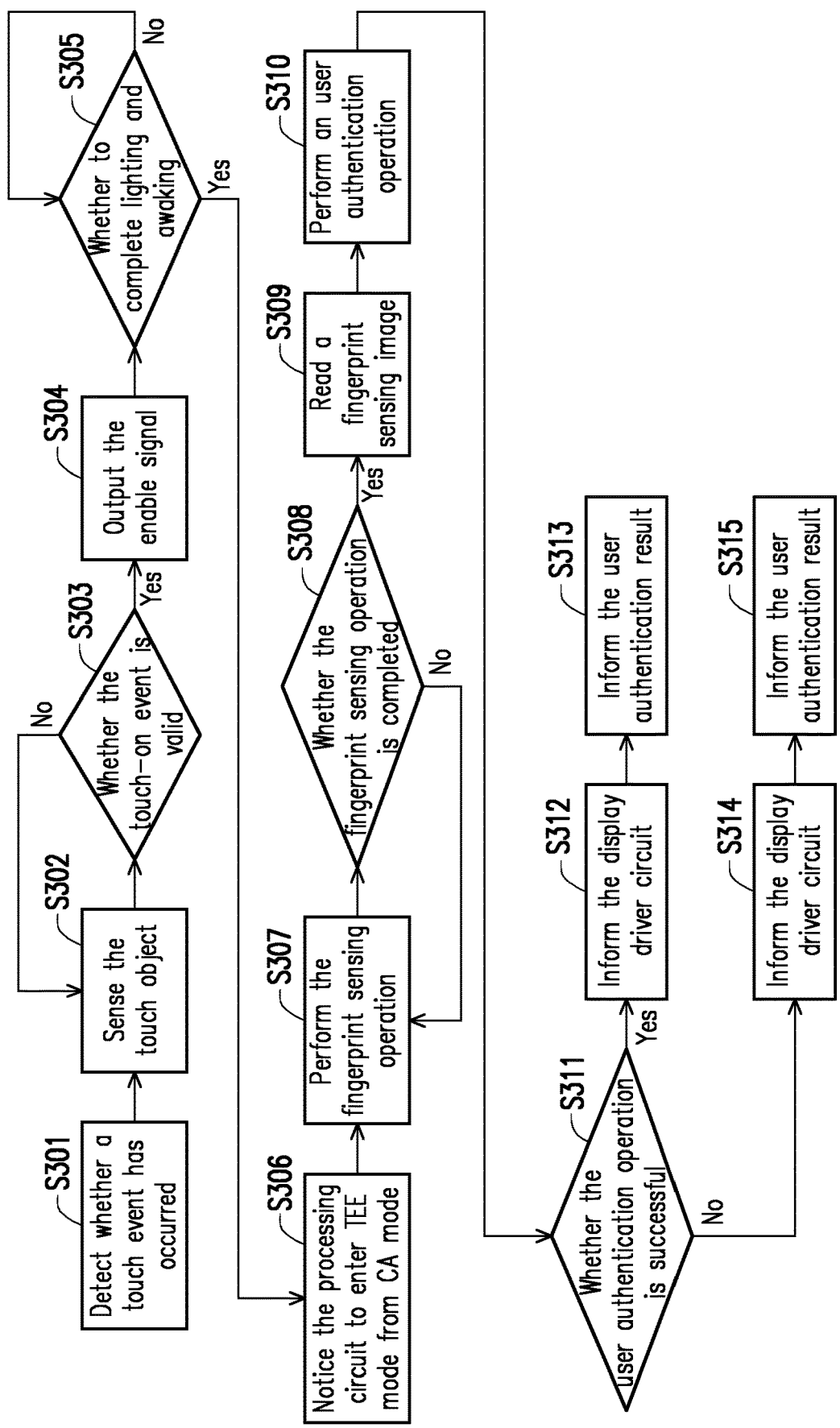
FIG. 3 is a flowing chart illustrating an unlock operation of the terminal device according to an embodiment of the disclosure.
Figure 4:
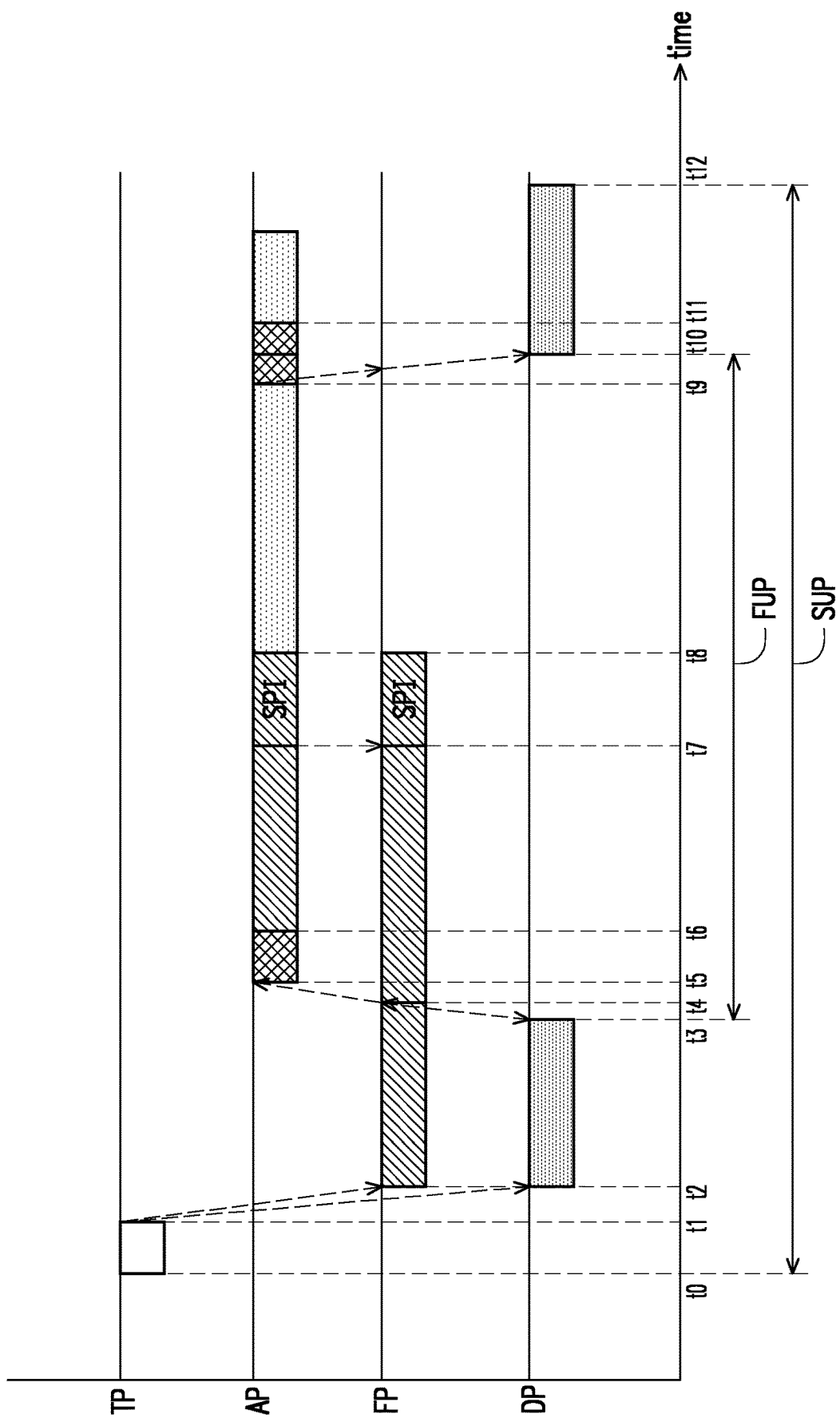
FIG. 4 is an operation timing diagram of the unlock operation according to the embodiment of FIG. 3.

FIG. 3 is a flowing chart illustrating an unlock operation of the terminal device according to an embodiment of the disclosure. FIG. 4 is an operation timing diagram of the unlock operation according to the embodiment of FIG. 3. Referring to FIG. 1, FIG. 3, and FIG. 4, the terminal device 10 of FIG. 1 is adapted to execute the steps S301 to S315 to perform the unlock operation of the terminal device 10. The fingerprint sensing control circuit 110 may be operated as the operation timing FP as shown in FIG. 4. The touch sensing control circuit 120 may be operated as the operation timing TP as shown in FIG. 4. The display driving circuit 130 may be operated as the operation timing DP as shown in FIG. 4. The processing circuit 210 may be operated as the operation timing AP as shown in FIG. 4. In step S301, the touch sensing control circuit 120 may detect whether a touch-on event has occurred on the touch display panel 230 at time t0. In step S302, the touch sensing control circuit 120 may sense the touch object 240 during the period from time t0 to time t1. In step S303, the touch sensing control circuit 120 may determine whether the touch-on event is valid.

In the embodiment of the disclosure, the touch sensing control circuit 120 may determine whether a continuous touch time of the touch-on event on the touch display panel 230 is greater than a time threshold to output the enable signal during the period at time t1, but the disclosure is not limited thereto. In an embodiment of the disclosure, the touch sensing control circuit 120 may determine whether a touch coordinate of the touch-on event on the touch display panel 230 is located in a predetermined coordinate range to output the enable signal. In another embodiment of the disclosure, the touch sensing control circuit 120 may determine whether a touch area of the touch-on event on the touch display panel 230 is greater than an area threshold to output the enable signal. In the embodiment of the disclosure, if the touch sensing control circuit 120 determines that the touch-on event is valid, the driver integrated circuit 100 executes step S304. If the touch sensing control circuit 120 determines the touch-on event is invalid, the driver integrated circuit 100 re-executes step S302 to continuously sense the touch object 240.

In step S304, the touch sensing control circuit 120 may output the enable signal to the fingerprint sensing control circuit 110 and the display driving circuit 130 at time t1. Thus, the fingerprint sensing control circuit 110 may be awaked up from a sleep mode, and the display driving circuit 130 may light up the fingerprint sensing region 241 or display a light pattern in the fingerprint sensing region 241 for illuminating the touch object 240 placed on the touch display panel 230 during the period from time t2 to time t3. However, in an embodiment of the disclosure, the touch sensing control circuit 120 may output the enable signal to one of the fingerprint sensing control circuit 110 and the display driving circuit 130, and then the one of the fingerprint sensing control circuit 110 and the display driving circuit 130 informs another one of the fingerprint sensing control circuit 110 and the display driving circuit 130.

In step S305, the fingerprint sensing control circuit 110 may continuously determine whether that the display driving circuit 130 has completed lighting up and the fingerprint sensing control circuit 110 has completed awaking. When the display driving circuit 130 has completed lighting up at time t3, the display driving circuit 130 may inform the fingerprint sensing control circuit 110. In step S306, at time t4, the fingerprint sensing control circuit 110 has completed awaking, thus the fingerprint sensing control circuit 110 may output, for example, an interrupt signal to the application program 221 being executed by the processing circuit 210 to notice the processing circuit 210 to enter the TEE mode from a REE mode during the second direct communication. The second direct communication occurs after the first direct communication. However, in an embodiment of the disclosure, the processing circuit 210 may be noticed by the touch sensing control circuit 120 or the display driving circuit 130 to enter the TEE mode from the REE mode during the second direct communication. In addition, when the processing circuit 210 is operated in the REE mode, the processing circuit 210 may, for example, execute a client application (CA) or other application, and the disclosure is not limited thereto.

In step S307, the fingerprint sensing control circuit 110 may perform the fingerprint sensing operation during the period from the time t4 to time t7. At the same time, the processing circuit 210 may enter the trusted execution environment during the period from time t5 to time t6, and the processing circuit 210 is waiting and polling data ready during the period from time t6 to time t7. In step S308, the fingerprint sensing control circuit 110 determine whether the fingerprint sensing operation is completed. If the fingerprint sensing operation has completed, the driver integrated circuit 100 executes step S309. If the fingerprint sensing operation has not been completed, the driver integrated circuit 100 re-executes step S307. In step S309, after the fingerprint sensing control circuit 110 completes the fingerprint sensing operation, the processing circuit 210 reads a fingerprint sensing image from the fingerprint sensing control circuit 110 through a serial peripheral interface (SPI) through the second direct communication during the period from time t7 to time t8.

In step S310, the application program 221 being executed by the processing circuit 210 may perform the user authentication operation according to the fingerprint sensing image during the period from time t8 to time t9. In step S311, the application program 221 may determine whether the user authentication operation is successful. In step S312, if the user authentication operation is successful, the processing circuit 210 may inform the display driving circuit 130 during the second communication. The processing circuit 210 may output a control command to the display driving circuit 130 through the fingerprint sensing control circuit 110 during the period at time t9, so that the display driving circuit 130 drives the touch display panel 230 to display a unlock screen or display an application program screen during the period from time t10 to time t12. In step S313, during the period from time t9 to time t11, the processing circuit 210 may be changed to execute enter the REE mode from the TEE mode to inform the user authentication result to the framework program of the terminal device 10, and then the processing circuit 210 may be changed back to the TEE mode to execute other processing, such as related unlock processing during the period from time t11 to time t12. It is should be noted that each of the above first direct communication and the above second direct communication occurs after the fingerprint sensing operation performed by the fingerprint sensing control circuit 110 and after the successful user authentication operation by the processing circuit 210.

However, in step S314, if the user authentication operation is failed, the processing circuit 210 may output another command to the display driving circuit 130 through the fingerprint sensing control circuit 110 at time t9, so that the display driving circuit 130 maintains the touch display panel 230 displaying a lock screen or an application program screen, or to dims the touch display panel 230 during the period from time t10 to time 12. In step S315, during the period from time t9 to time t11, the processing circuit 210 may be changed to execute enter the REE mode from the TEE mode to inform the user authentication result to the framework program of the terminal device 10, and then the processing circuit 210 may be changed back to the TEE mode to execute other processing, such as related learning processing for next fingerprint sensing after time tn. It is should be noted that the each of the above first direct communication and the above second direct communication occurs after the fingerprint sensing operation performed by the fingerprint sensing control circuit 110 and after a failed user authentication operation by the processing circuit 210.

Therefore, in the embodiment of the disclosure, the driver integrated circuit 100 and the terminal device 10 may effectively reduce the time required for waiting the processing circuit 210 to switch execution in different operating system environments for generating the control command by executing the above steps S301 to S315, so as to quickly perform the unlock operation of the terminal device 10. In other words, comparing with conventional unlock operation, since the processing circuit 210 no need to frequently change to enter the different operation modes during the fingerprint unlock period FUP, the time length of the fingerprint unlock period FUP may be effectively reduced, so that the somatosensory unlock period of terminal device 10 from time t0 to time t12 may also be correspondingly reduced.

Figure 5:
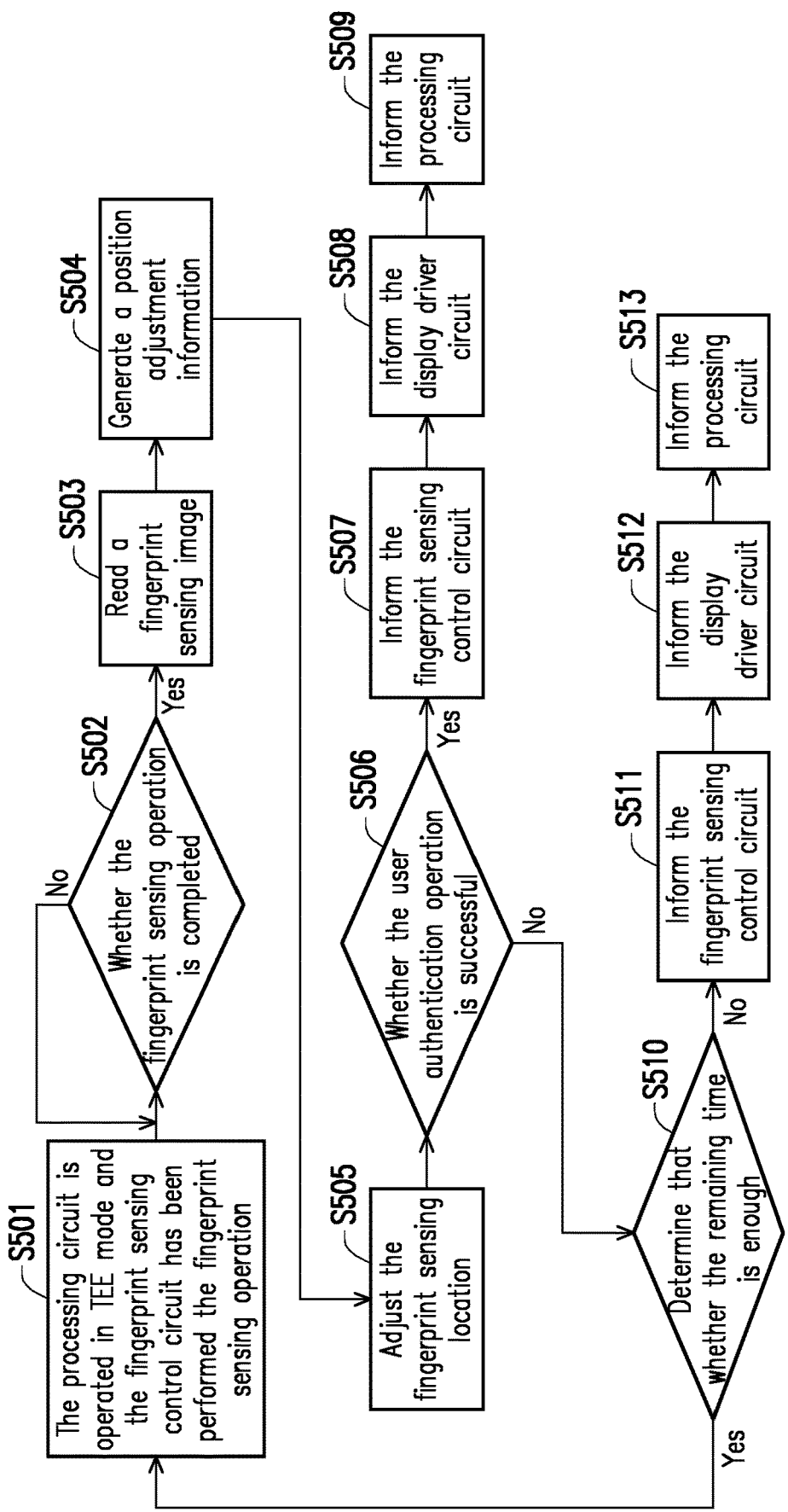
FIG. 5 is a flowing chart illustrating an unlock operation of the terminal device according to another embodiment of the disclosure.
Figure 6:
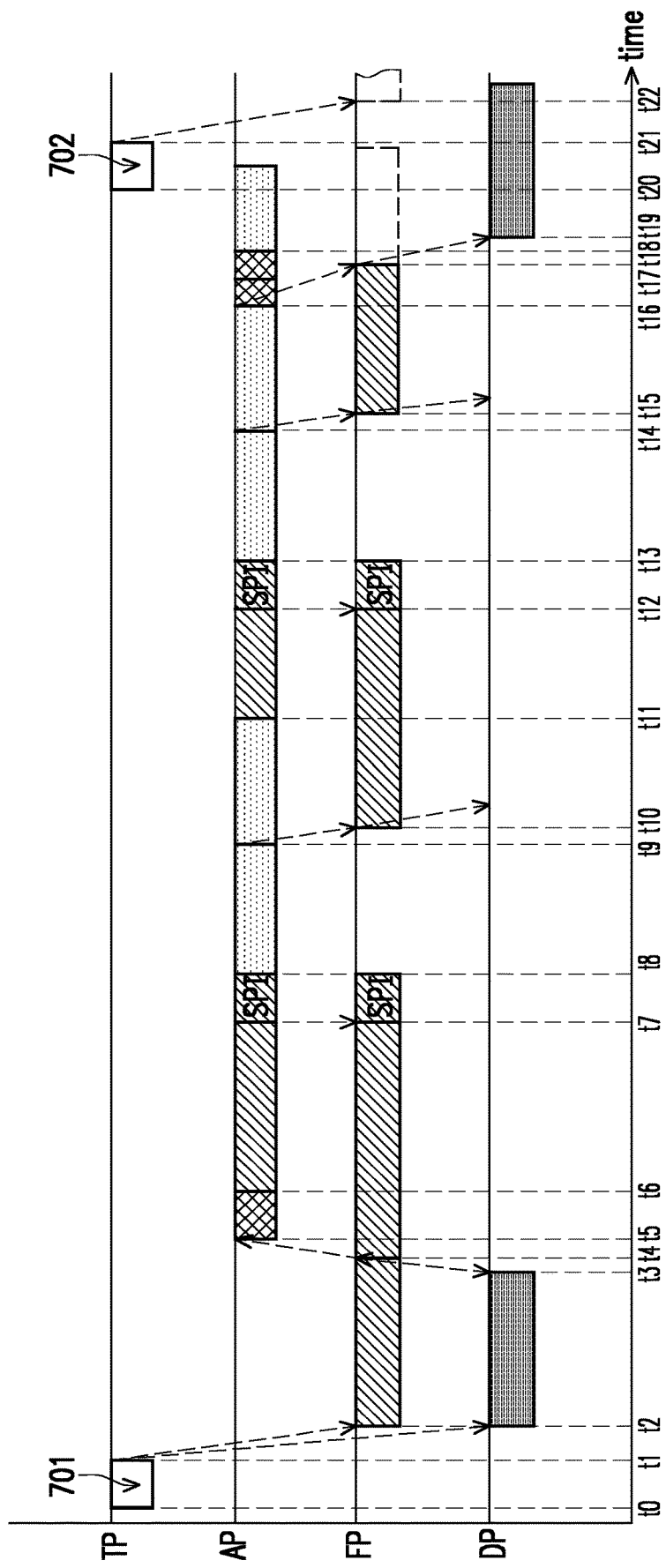
FIG. 6 is an operation timing diagram of the unlock operation according to the embodiment of FIG. 5.
Figure 7:
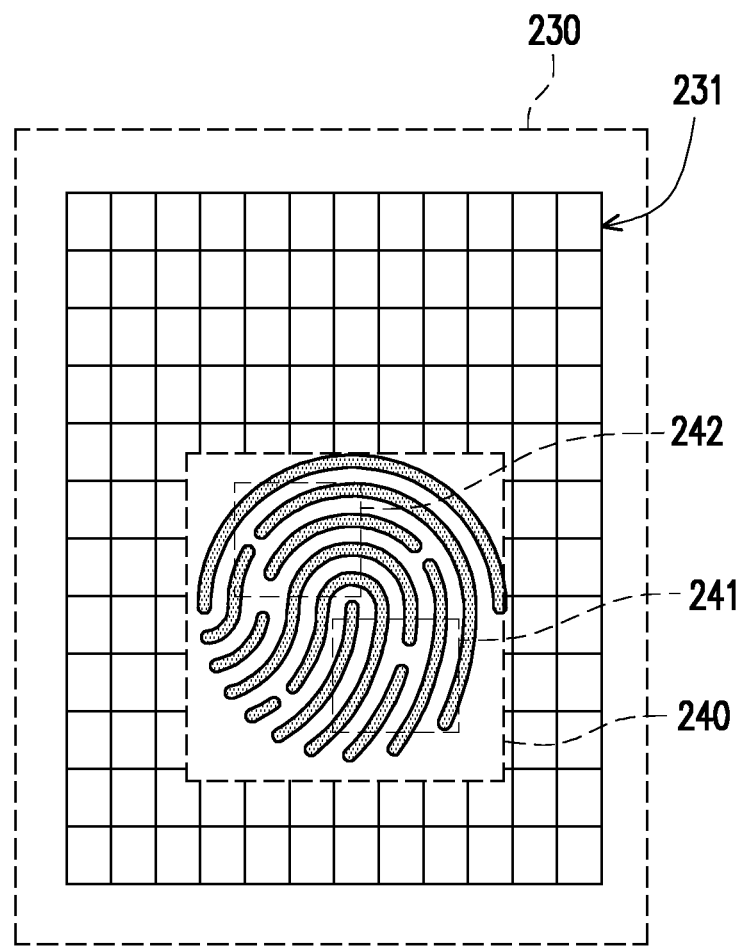
FIG. 7 is a schematic diagram illustrating the touch display panel according to another embodiment of the disclosure.

FIG. 5 is a flowing chart illustrating an unlock operation of the terminal device according to another embodiment of the disclosure. FIG. 6 is an operation timing diagram of the unlock operation according to the embodiment of FIG. 5. FIG. 7 is a schematic diagram illustrating the touch display panel according to another embodiment of the disclosure. Referring to FIG. 1, FIG. 5, to FIG. 7, the terminal device 10 of FIG. 1 is adapted to execute the steps S501 to S513 to perform the unlock operation of the terminal device 10. The fingerprint sensing control circuit 110 may be operated as the operation timing FP as shown in FIG. 6. The touch sensing control circuit 120 may be operated as the operation timing TP as shown in FIG. 6. The display driving circuit 130 may be operated as the operation timing DP as shown in FIG. 6. The processing circuit 210 may be operated as the operation timing AP as shown in FIG. 6. Referring to FIG. 6, the touch sensing control circuit 120 may detect whether a touch-on event 701 has occurred on the touch display panel 230 at time t0 to start the unlock operation of the terminal device 10. The touch sensing control circuit 120 may sense the touch object 240 during the period from time t0 to time t1. Then the touch sensing control circuit 120 may output the enable signal to the fingerprint sensing control circuit 110 and the display driving circuit 130 at time t1. Thus, the fingerprint sensing control circuit 110 may be awaked up from a sleep mode, and the display driving circuit 130 may light up the fingerprint sensing region 241 or display a light pattern in the fingerprint sensing region 241 for illuminating the touch object 240 placed on the touch display panel 230 during the period from time t2 to time t4. Then, when the display driving circuit 130 has completed lighting up at time t3, the display driving circuit 130 may inform the fingerprint sensing control circuit 110, so that the fingerprint sensing control circuit 110 starts the fingerprint sensing operation (first fingerprint sensing operation) at time t4, and the fingerprint sensing control circuit 110 performs the fingerprint sensing operation during the period from the time t4 to time t7. At time t4, the fingerprint sensing control circuit 110 may output, for example, an interrupt signal to the application program 221 being executed by the processing circuit 210 to notice the processing circuit 210 to enter the TEE mode from the REE mode during the second direct communication. Thus, the processing circuit 210 may enter the trusted execution environment during the period from time t5 to time t6, and the processing circuit 210 is waiting and polling data ready during the period from time t6 to time t7.

In step S501, the processing circuit 210 is operated in TEE mode and the fingerprint sensing control circuit 110 has been performed the fingerprint sensing operation. In step S502, the terminal device 10 determines whether the fingerprint sensing operation is completed. In step S503, after the fingerprint sensing operation has completed, the processing circuit 210 reads a fingerprint sensing image from the fingerprint sensing control circuit 110 through the serial peripheral interface through the second direct communication during the period from time t7 to time t8. Moreover, during the period from time t7 to time t8, the processing circuit 210 may further obtain the touch information of the touch object 240, such as touch coordinate parameters. Thus, in step S504, the processing circuit 210 may first process the touch information of the touch object 240 to determine a next fingerprint sensing region to generate a position adjustment information during the period from the time t8 to time t9, and then the processing circuit 210 may perform the user authentication operation according to the fingerprint sensing image during the period from time t9 to time tn. In step S505, the processing circuit 210 may provide the position adjustment information to the fingerprint sensing control circuit 110 at time t9. As shown in FIG. 7, the fingerprint sensing control circuit 110 may adjust the fingerprint sensing location 241 to a fingerprint sensing location 242 according to the position adjustment information at time t9. The fingerprint sensing location 241 may partially overlap or non-overlap the fingerprint sensing location 242. The fingerprint sensing control circuit 110 may further provide the position adjustment information to the display driving circuit 130 at time t10, so that the display driving circuit 130 may adjust a position of a lighted-up fingerprint sensing region on the touch display panel 230 according to the position adjustment information. Thus, after the display driving circuit 130 completes the position of the lighted-up fingerprint sensing region on the touch display panel 230, the fingerprint sensing control circuit 110 may continuously perform the next fingerprint sensing operation (second fingerprint sensing operation) during the period from time t10 to time t12.

In step S506, the processing circuit 210 may determine whether the user authentication operation is successful. If the user authentication operation has failed, in step S510, the processing circuit 210 may further determine whether a remaining time of a currently unlock operation is less than a preset time length threshold during the period time t10 to time t11, where the preset time length threshold may be designed for terminal device 10 capable of performing multiple fingerprint sensing operations so as to increase the chance of unlocking. If the processing circuit 210 determines that the remaining time of the currently unlock operation is less than the preset time length threshold, the processing circuit 210 is waiting and polling data ready again during the period from time t11 to time t12, and the terminal device 10 and the driver integrated circuit 100 returns to execute steps S501 and S502 to determine whether the next fingerprint sensing operation is completed. In step S503, after the next fingerprint sensing operation has completed, the processing circuit 210 reads a next fingerprint sensing image from the fingerprint sensing control circuit 110 through the serial peripheral interface through the second direct communication during the period from time t12 to time t13. Moreover, during the period from time t12 to time t13, the processing circuit 210 may further obtain another next touch information of the touch object 240.

Thus, in step S504, the processing circuit 210 may first process the another next touch information of the touch object 240 to determine another next fingerprint sensing region to generate another next position adjustment information during the period from the time t13 to time t14, and then the processing circuit 210 may perform the next user authentication operation according to the next fingerprint sensing image during the period from time t14 to time t16. In step S505, the processing circuit 210 may provide the another next position adjustment information to the fingerprint sensing control circuit 110 at time t14, so that the fingerprint sensing control circuit 110 may adjust the fingerprint sensing location 242 to perform another next fingerprint sensing operation (third fingerprint sensing operation) according to the another next position adjustment information at time t15. The fingerprint sensing control circuit 110 may further provide the position adjustment information to the display driving circuit 130 at time t15, so that the display driving circuit 130 may adjust the position of the lighted-up fingerprint sensing region on the touch display panel 230 according to the another next position adjustment information. Thus, after the display driving circuit 130 completes the position of the lighted-up fingerprint sensing region on the touch display panel 230, the fingerprint sensing control circuit 110 may start perform the another next fingerprint sensing operation (third fingerprint sensing operation) from time t15.

In step S506, the processing circuit 210 may determine whether the next user authentication operation is successful. In step S507, if the next user authentication operation is successful, the processing circuit 210 may inform the display driving circuit 130 at time t16. The processing circuit 210 may output the control command to the fingerprint sensing control circuit 110 to discontinue the another next fingerprint sensing operation at time t17. In Step S508, the fingerprint sensing control circuit 110 may further inform the display driving circuit 130 to unlock the screen of the touch display panel 230, and the display driving circuit 130 may execute other setting before unlocking the screen of the touch display panel 230 after time t19. In step S509, during the period from time t16 to time t18, the processing circuit 210 may be changed to execute enter the REE mode from the TEE mode to inform the user authentication result to the framework program of the terminal device 10, and then the processing circuit 210 may be changed back to the TEE mode to execute other processing, such as related unlock processing during the period after time t18. Therefore, the driver integrated circuit 100 and the terminal device 10 may effectively reduce the time required for the waiting processing circuit 210 to change executed in different operating system environments for generating the control command by executing the above steps S501 to S510, so as to quickly perform the multiple fingerprint sensing operations in the one unlock operation of the terminal device 10.

In addition, in another embodiment of the disclosure, the terminal device 10 may quickly perform new user authentication operation when the touch sensing control circuit 120 detect a next touch-on event 702 has occurred on the touch display panel 230 at time t20, so that the terminal device 10 starts a new fingerprint sensing operation for the next touch-on event 702. The touch sensing control circuit 120 may sense the touch object 240 quickly re-placed on the touch display panel 230 during the period from time t20 to time t21, and the touch sensing control circuit 120 may determine whether the next touch-on event 702 is valid. When the touch sensing control circuit 120 determine that the next touch-on event 702 is valid, the touch sensing control circuit 120 may output new enable signal to the fingerprint sensing control circuit 110 and the display driving circuit 130 at time t22. Therefore, in the another embodiment of the disclosure, the driver integrated circuit 100 may quickly perform the new user authentication operation, and no need to wait the display driving circuit 130 and the processing circuit 210 completes the previously operations.

However, in yet another embodiment, continuing the time t14 of the above embodiment, in step S511, if the user authentication operation has failed and the processing circuit 210 determines that whether the remaining time of the one unlock operation is less than the preset time length threshold during the period time t14 to time t16, the terminal device 10 execute step S511. In step S511, the processing circuit 210 may inform the display driving circuit 130 at time t16. The processing circuit 210 may output the control command to the fingerprint sensing control circuit 110 to discontinue the another next fingerprint sensing operation at time t17. In Step S512, the fingerprint sensing control circuit 110 may further inform the display driving circuit 130 to keep display the lock screen of the touch display panel 230 after time t19. In step S513, during the period from time t16 to time t18, the processing circuit 210 may be changed to execute enter the REE mode from the TEE mode to inform the user authentication result to the framework program of the terminal device 10, and then the processing circuit 210 may be changed back to the TEE mode to execute other processing, such as related learning processing for rectifying next unlock operation corresponding to next touch-on event 702. Therefore, the driver integrated circuit 100 and the terminal device 10 may effectively manage the time length of the one unlock operation by executing the above steps S501 to S513. If the touch-on event 701 cannot pass the user authentication operation, the terminal device 10 may stop the current unlock operation, and request the user to perform a new unlock operation by re-placed the finger on the touch display panel 230 again, so as to add the chance of entering the terminal device 10.

In summary, the driver integrated circuit for fingerprint sensing, touch sensing, and display driving and the driving method thereof of the disclosure are capable of reducing the time required for waiting for the processing circuit of the terminal device switching operations in different operating system environments during the unlock operation by establishing the first direct communication and the second direct communication. Thus, the driver integrated circuit and the driving method thereof of the disclosure are capable of quickly performing the unlock operation of the terminal device.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A driver integrated circuit for fingerprint sensing, touch sensing and display driving, adapted for driving a touch display panel with a fingerprint sensor, wherein the driver integrated circuit comprises:
    a fingerprint sensing control circuit, integrated in the driver integrated circuit, configured to drive the fingerprint sensor that is located in the display panel to perform a fingerprint sensing operation,
    a display driving circuit, configured to drive the touch display panel to perform a display operation; and
    a touch sensing control circuit, configured to drive the touch display panel to perform a touch operation,
    wherein the fingerprint sensing control circuit and the display driving circuit are configured to have a first direct communication therebetween so as to facilitate at least one of the fingerprint sensing operation and the display operation,
    wherein the fingerprint sensing control circuit is further configured to have a second direct communication with a processing circuit external to the driver integrated circuit, and the first direct communication occurs after the second direct communication and causes the display driving circuit to adjust the display operation.

2. The driver integrated circuit according to claim 1, wherein the first direct communication occurs under a rich execution environment (REE) mode, in which the display driving circuit is configured to light up at least one fingerprint sensing region on the touch display panel and then inform the fingerprint sensing control circuit to start performing the fingerprint sensing operation during the first direct communication.

3. The driver integrated circuit according to claim 1, wherein the first direct communication occurs under a REE mode, in which the fingerprint sensing control circuit is configured to be informed by a touch-on event by the touch sensing control circuit then inform the display driving circuit to light up a fingerprint sensing region on the touch display panel during the first direct communication.

4. The driver integrated circuit according to claim 1, wherein the touch sensing control circuit is configured to determine whether to output an enable signal to one of the fingerprint sensing control circuit and the display driving circuit, so that the one of the fingerprint sensing control circuit and the display driving circuit further enables another one of the fingerprint sensing control circuit and the display driving circuit in response to a touch-on event on the touch display panel.

5. The driver integrated circuit according to the claim 4, wherein the touch sensing control circuit determines whether a touch area of the touch-on event on the touch display panel is greater than an area threshold to output the enable signal.

6. The driver integrated circuit according to the claim 4, wherein the touch sensing control circuit determines whether a continuous touch time of the touch-on event on the touch display panel is greater than a time threshold to output the enable signal.

7. The driver integrated circuit according to the claim 4, wherein the touch sensing control circuit determines whether a touch coordinate of the touch-on event on the touch display panel is located in a predetermined coordinate range to output the enable signal.

8. The driver integrated circuit according to the claim 4, wherein the touch display panel is pre-operated in a dark screen state, and when the display driving circuit is enabled to light up the touch display panel, the touch display panel is changed to operate in a bright screen state.

9. The driver integrated circuit according to the claim 8, wherein the touch display panel is lighted up to display a light pattern for illuminating a touch object placed on the touch display panel.

10. The driver integrated circuit according to claim 1, wherein each of the first direct communication and the second direct communication occurs under a TEE mode.

11. The driver integrated circuit according to claim 10, wherein the each of the first direct communication and the second direct communication occurs during the fingerprint sensing operation being performed by the fingerprint sensing control circuit.

12. The driver integrated circuit according to claim 11, wherein during the second direct communication, the fingerprint sensing control circuit is configured to be informed by the processing circuit of position adjustment information, and during the first direct communication, the fingerprint sensing control circuit is configured to inform the display driving circuit to adjust a position of a lighted-up fingerprint sensing region on the touch display panel according to the position adjustment information.

13. The driver integrated circuit according to the claim 12, wherein the fingerprint sensing control circuit adjust a fingerprint sensing location according to the position adjustment information, and the fingerprint sensing control circuit performs a next fingerprint sensing operation.

14. The driver integrated circuit according to the claim 13, wherein during the next fingerprint sensing operation, if the user authentication operation is successful, the fingerprint sensing control circuit discontinues the next fingerprint sensing operation.

15. The driver integrated circuit according to the claim 13, wherein during the next fingerprint sensing operation, if the user authentication operation is failed, the processing circuit determines that whether a remaining time of a currently unlock operation is less than a preset time length threshold,
    when the remaining time of the currently unlock operation is less than the time of the preset time length threshold, the fingerprint sensing control circuit discontinues a next fingerprint sensing operation,
    when the remaining time of the currently unlock operation is greater than or equal to the preset time length threshold, the fingerprint sensing control circuit continues the next fingerprint sensing operation.

16. The driver integrated circuit according to claim 10, wherein each of the first direct communication and the second direct communication occurs after the fingerprint sensing operation performed by the fingerprint sensing control circuit and after a successful user authentication operation by the processing circuit.

17. The driver integrated circuit according to claim 16, wherein during the second direct communication, the fingerprint sensing control circuit is configured to be informed of the successful user authentication operation by the processing circuit, and during the first direction communication, the fingerprint sensing control circuit is configured to inform the display driving circuit to drive the touch display panel to display a unlock screen or display an application program screen.

18. The driver integrated circuit according to the claim 10, wherein each of the first direct communication and the second direct communication occurs after the fingerprint sensing operation performed by the fingerprint sensing control circuit and after a failed user authentication operation by the processing circuit.

19. The driver integrated circuit according to the claim 18, wherein during the second direct communication, the fingerprint sensing control circuit is configured to be informed of the failed user authentication operation by the processing circuit, and during the first direction communication, the fingerprint sensing control circuit is configured to inform the display driving circuit to maintain displaying a lock screen or an application program screen, or to dim the touch display panel.

20. A driving method, adapted to a driver integrated circuit for fingerprint sensing, touch sensing and display driving, wherein the driver integrated circuit is adapted for driving a touch display panel with a fingerprint sensor that is located in the display panel, and the driver integrated circuit comprises a fingerprint sensing control circuit that integrated in the driver integrated circuit, a display driving circuit, and a touch sensing control circuit, wherein the driver integrated circuit comprises:
    facilitating at least one of a fingerprint sensing operation and a display operation through a first direct communication between the fingerprint sensing control circuit and the display driving circuit;
    communicating with a processing circuit external to the driver integrated circuit by the fingerprint sensing control circuit to establish a second direct communication to cause the display driving circuit to adjust the display operation, wherein the first direct communication occurs after the second direct communication.

21. The driving method according to claim 20, wherein the first direct communication occurs under a rich execution environment (REE) mode, and the driving method comprises:
    lighting up a fingerprint sensing region on the touch display panel by the display driving circuit during the first direct communication; and
    informing the fingerprint sensing control circuit to start performing the fingerprint sensing operation by the display driving circuit during the first direct communication.

22. The driving method according to claim 20, wherein the first direct communication occurs under a REE mode, and the driving method comprises:
    informing the fingerprint sensing control circuit by a touch-on event by the touch sensing control circuit during the first direct communication; and
    informing the display driving circuit to light up a fingerprint sensing region on the touch display panel by the touch sensing control circuit during the first direct communication.

23. The driving method according to claim 20, further comprising:
    determining whether to output a enable signal to one of the fingerprint sensing control circuit and the display driving circuit, so that the one of the fingerprint sensing control circuit and the display driving circuit further enables another one of the fingerprint sensing control circuit and the display driving circuit according to a touch-on event on the touch display panel by the touch sensing control circuit.

24. The driving method according to claim 23, wherein the step of determining whether to output the enable signal comprises:
    determining whether a touch area of the touch-on event on the touch display panel is greater than an area threshold to output the enable signal by the touch sensing control circuit.

25. The driving method according to claim 23, wherein the step of determining whether to output the enable signal comprises:
    determining whether a continuous touch time of the touch-on event on the touch display panel is greater than a time threshold to output the enable signal by the touch sensing control circuit.

26. The driving method according to claim 23, wherein the step of determining whether to output the enable signal comprises:
    determining whether a touch coordinate of the touch-on event on the touch display panel is located in a predetermined coordinate range to output the enable signal by the touch sensing control circuit.

27. The driving method according to claim 23, wherein the touch display panel is pre-operated in a dark screen state, and when the display driving circuit is enabled to light up the touch display panel, the touch display panel is changed to operate in a bright screen state.

28. The driving method according to claim 27, wherein the touch display panel is lighted up to display a light pattern for illuminating a touch object placed on the touch display panel.

29. The driving method according to claim 20, wherein each of the first direct communication and the second direct communication occurs under a TEE mode.

30. The driving method according to claim 29, wherein the each of the first direct communication and the second direct communication occurs during the fingerprint sensing operation being performed by the fingerprint sensing control circuit.

31. The driving method according to claim 30, further comprising:
    informing the fingerprint sensing control circuit by the processing circuit of position adjustment information during the second direct communication; and
    informing the display driving circuit to adjust a position of a lighted-up fingerprint sensing region on the touch display panel according to the position adjustment information by the fingerprint sensing control circuit during the first direct communication.

32. The driving method according to claim 31, further comprising:
    adjusting a fingerprint sensing location according to the position adjustment information by the fingerprint sensing control circuit;

performing a next fingerprint sensing operation by the fingerprint sensing control circuit.

33. The driving method according to claim 32, further comprising:
    if the user authentication operation is successful during the next fingerprint sensing operation, discontinuing the next fingerprint sensing operation by the fingerprint sensing control circuit.

34. The driving method according to claim 32, further comprising:
    during the next fingerprint sensing operation, if the user authentication operation is failed, determining that whether a remaining time of a currently unlock operation is less than a preset time length threshold by the processing circuit;
    when the remaining time of the currently unlock operation is less than the time of the preset time length threshold, discontinuing a next fingerprint sensing operation by the fingerprint sensing control circuit; and
    when the remaining time of the currently unlock operation is greater than or equal to the preset time length threshold, continuing the next fingerprint sensing operation by the fingerprint sensing control circuit.

35. The driving method according to claim 29, wherein each of the first direct communication and the second direct communication occurs after the fingerprint sensing operation performed by the fingerprint sensing control circuit and after a successful user authentication operation by the processing circuit.

36. The driving method according to claim 35, further comprising:
    informing the fingerprint sensing control circuit with the successful user authentication operation by the processing circuit during the second direct communication; and
    informing the display driving circuit to drive the touch display panel to display a unlock screen or display an application program screen by the fingerprint sensing control circuit during the first direction communication.

37. The driving method according to claim 29, wherein each of the first direct communication and the second direct communication occurs after the fingerprint sensing operation performed by the fingerprint sensing control circuit and after a failed user authentication operation by the processing circuit.

38. The driving method according to claim 37, further comprising:
    informing the fingerprint sensing control circuit with the failed user authentication informing the display driving operation by the processing circuit during the second direct communication; and
    informing the display driving
    circuit to drive the touch display panel to maintain displaying a lock screen or an application program screen, or to dim the touch display panel.

* * * * *